United States Patent [19]

Kawamura et al.

[11] Patent Number: 4,805,165

[45] Date of Patent: Feb. 14, 1989

[54] TIME DIVISION MULTIPLEX DATA TRANSMISSION METHOD AND APPARATUS

[75] Inventors: Masataka Kawamura, Tokyo; Toshimichi Shimatani, Fuchu, both of Japan

[73] Assignee: Iwatsu Electric Co., Ltd., Tokyo, Japan

[21] Appl. No.: 27,807

[22] Filed: Mar. 19, 1987

[30] Foreign Application Priority Data

Mar. 24, 1986 [JP] Japan .................................. 61-65524

[51] Int. Cl.$^4$ ............................ H04J 3/22; H04J 3/04
[52] U.S. Cl. ...................................... 370/84; 370/112
[58] Field of Search ......................... 370/84, 112, 109

[56] References Cited

U.S. PATENT DOCUMENTS

4,520,479  5/1985  Grima et al. ......................... 370/84
4,658,152  4/1987  Walters ................................. 370/84

Primary Examiner—Douglas W. Olms
Assistant Examiner—Wellington Chin
Attorney, Agent, or Firm—Woodcock Washburn Kurtz Mackiewicz & Norris

[57] ABSTRACT

A telecommunications network such as a key telephone system having n terminal devices such as telephone sets which are notionally divided into m groups, for the time division multiplex transmission and reception of m groups of n channels of data, where n is at least six and m is at least three. The invention particularly features a method of, and apparatus for, demultiplexing the multiplex data signal prior to reception by the terminal devices. The multiplex data signal is such that the n channels of data are assigned respectively to a set of n consecutive time slots making up one frame. Under the direction of a control circuit the multiplexed m groups of n channels of data are written onto m groups of n demultiplexing shift registers, respectively, at a relatively high speed. Then each group of shift registers are read at a relatively lower speed during each time interval from the end of the writing of the corresponding group of channels of data of one frame to the beginning of the writing of the same group of channels of data of the next frame. The shift registers serve the dual purpose of demultiplexing and compensating for the difference in the rate of data flow on their input and output sides.

11 Claims, 7 Drawing Sheets

DEMULTIPLEXING OF ALL THE CHANNELS OF DATA

FIG. 5  DEMULTIPLEXING OF GROUP 1 OF CHANNELS OF DATA

FIG. 7 MULTIPLEXING OF GROUP 1 OF CHANNELS OF DATA

TIME DIVISION MULTIPLEX DATA TRANSMISSION METHOD AND APPARATUS

BACKGROUND OF THE INVENTION

Our invention pertains to the art of multichannel digital data transmission by time division multiplexing. A typical application of our invention is in the field of intercommunicating systems such as key telephone systems, although we do not wish our invention to be limited to this particular application because the fundamental concepts of our invention obviously lend themselves to application to a greater range of data transmission or reception systems.

The key telephone system has been known which provides intercommunication between a plurality or multiplicity of key operated telephones on the same premises and, possibly, communication with the nationwide telephone network. It has also been known to transmit and receive calls by time division multiplexing, via a time division digital switching circuit, in such key telephone systems. U.S. patent application Ser. No. 792,365 filed Oct. 29, 1985, by Kawamura et al., now U.S. Pat. No. 4,658,397, describes and claims a time division digital data transfer system adaptable for use with a switching circuit in a time division multiplex, digital key telephone system.

The key telephone system disclosed in the noted patent application has several groups of telephones for intercommunication as well as for communication with those of the nationwide network. Each group of telephones are provided with a common multiplexer for sending as many channels of messages over an output highway to the digital switching circuit by time division multiplexing. Each group of telephones are also provided with a common demultiplexer for separating the incoming messages into the individual channels as such messages are fed by mulplexing over an input highway from the switching circuit.

As heretofore constructed, each multiplexer has typically comprised an input buffer, a latch circuit and an output buffer, with the input and output buffers usually taking the form of shift registers. The multiplexers operate to combine the message signals, fed at relatively low speed from the associated telephones, into a time division multiplex signal for transmission at relatively higher speed over the output highway to the switching circuit. The buffers are needed because of the difference in transmission speed on the input and output sides of the multiplexers. Accordingly, the multiplexers must serve the dual purpose of multiplexing and compensating for the difference in transmission speed.

Each demultiplexer has been of like circuit configuration, comprising an input buffer, a latch circuit, and an output buffer. The input buffer takes in the associated channel of intelligence from the multiplex signal delivered at the higher speed from the switching circuit over the input highway. The latch circuit coacts with the output buffer to deliver each channel of intelligence to the associated telephone at the lower speed. Thus the demultiplexers must also perform the dual purpose of demultiplexing and compensating for the difference in transmission speed.

We object to these prior art multiplexer and demultiplexer constructions because each telephone, or any other equivalent terminal device, requires two multiplexing buffer memories and two demultiplexing buffer memories, in addition to latch circuits. Four times as many buffer memories have heretofore been necessary as there are terminal devices. The manufacturing costs of such complex multiplexers and demultiplexers have been prohibitive particularly in data transmission systems employing a large number of terminal devices.

SUMMARY OF THE INVENTION

We have hereby invented how to simplify the construction of equipment used for multichannel data transmission by time division multiplexing, particularly that of demultiplexers such as those used in key telephone systems.

The fundamental concepts of our invention, stated in one aspect thereof, reside in a multichannel data transmission method wherein n channels of data are transmitted in m groups over a common time-divided highway in serial format and at a first speed, where n is at least six and m is at least three, with the n channels of data assigned respectively to a set of n consecutive time slots making up one frame. At the receiving end of the timedivided highway the the m groups of n channels of data are written onto m groups of n memories, respectively, at the first speed. Then the data are read out from each group of memories at a second speed, lower than the first speed, during a time interval from the end of the writing of the corresponding group of channels of data of one frame to the beginning of the writing of the same group of channels of data of the next frame. Then the n channels of data, read out from the respective memories as above, are transmitted over n channel paths, respectively, at the second speed.

The above summarized method is applicable, for example, to the demultiplexing of switched calls in a key telephone system, just before delivery of such calls to the individual telephones. It is to be noted that the n channels of data are not read out simultaneously; instead, each group of such channels of data are read out from the corresponding group of memories at a series of spaced time intervals during which the other groups of channels of data are being written onto the corresponding groups of memories. Since at least three groups of channels, and as many groups of memories, are provided, the memories can be read at a speed lower than that at which the data are written thereon.

Therefore, according to our invention, each demultiplexer may simply comprise just as many memories as there are terminal devices connected thereto. The memories function not only to separate the incoming multiplex data signal into the individual channels but also to compensate for the difference in transmission speed.

Stated in another aspect thereof, our invention provides apparatus for use in the practice of the above method. Typically, each memory can take the form of a shift register. The writing and reading of m groups of n channels of data on and from the m groups of n channels of shift registers can be easily controlled by a control circuit coupled to their clock inputs and strobe inputs.

The above and other features and advantages of our invention and the manner of realizing them will become more apparent, and the invention itself will best be understood, from a study of the following description and appended claims, with reference had to the attached drawings showing the preferred embodiment of the invention.

DETAILED DESCRIPTION

General

Figure 1:
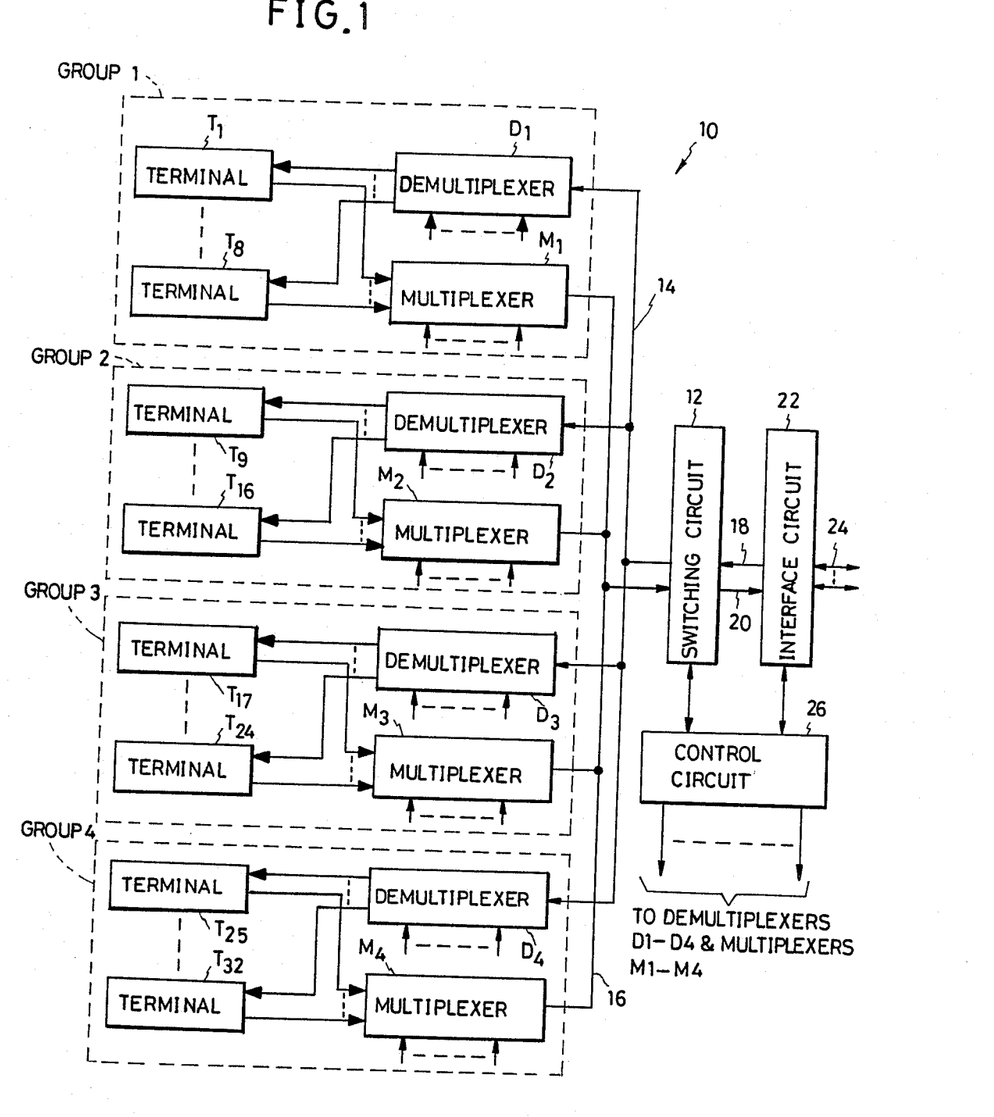
FIG. 1 is a block diagram showing a key telephone system embodying the principles of our invention.

We will now describe our invention in detail as adapted for the key telephone system illustrated in FIG. 1. Generally designated 10, the key telephone system is shown to have 32 (n) telephone sets or terminal devices T1–T32 which are divided into four (m) groups each consisting of eight terminals. The four groups of terminals T1–T32 are all coupled to a digital switching circuit 12 via four demultiplexers D1–D4, respectively, and an input highway 14 on one hand and, on the other hand, via four multiplexers M1–M4, respectively, and an output highway 16. Thus the 32 terminals T1–T32 are capable of intercommunication by time division multiplexing. Each of the four multiplexers M1–M4 and each of the four demultiplexers D1–D4 serves for multiplexing, and demultiplexing, the calls from, and to, the associated group of eight terminals.

The digital switching circuit 12, which operates to rearrange the 32 channels of data being transmitted by time division multiplexing, can be of conventional design. A preferred example of such switching circuit is that described and claimed in the aforesaid U.S. patent to Kawamura et al.

Preferably, and as indicated in FIG. 1, the switching circuit 12 is coupled via input and output highways 18 and 20 to an interface circuit 22 for connection of the key telephone system 10 to the nationwide telephone network via a required number of central office lines 24. The interface circuit 22 is equipped for analog to digital conversion and other control functions in admitting calls from the nationwide telephone network, and for digital to analog conversion and other functions in sending out calls from the key telephone system 10 to the nationwide telephone network. Calls from the nationwide telephone network are directed from interface circuit 22 to switching circuit 12 by time division multiplexing over the input highway 18. Similarly, messages from the key telephone system 10 to the nationwide telephone network are transmitted from switching circuit 12 to interface circuit 22 by time division multiplexing over the output highway 20. We have not shown the interface circuit 22 in detail because the association of the key telephone system 10 with the nationwide telephone network is not an essential feature of our invention.

FIG. 1 further indicates that a control circuit 26 is coupled to both switching circuit 12 and interface circuit 22 for controlling their operations in an known manner. Further, although not clearly shown in FIG. 1, this control circuit is coupled to all the demultiplexers D1–D4 and all the multiplexers M1–M4 for controlling the demultiplexing and multiplexing of the data to and from the terminals T1–T32, as will become apparent as the description proceeds.

We will discuss hereafter the more detailed configurations of the demultiplexers D1–D4 and multiplexers M1–M4 in conjunction with the terminals T1–T32 and control circuit 26. Such discussion will be followed by an explanation of the operation of the complete key telephone system 10, particularly with respect to its methods of data transmission and reception.

Demultiplexers

Figure 2:
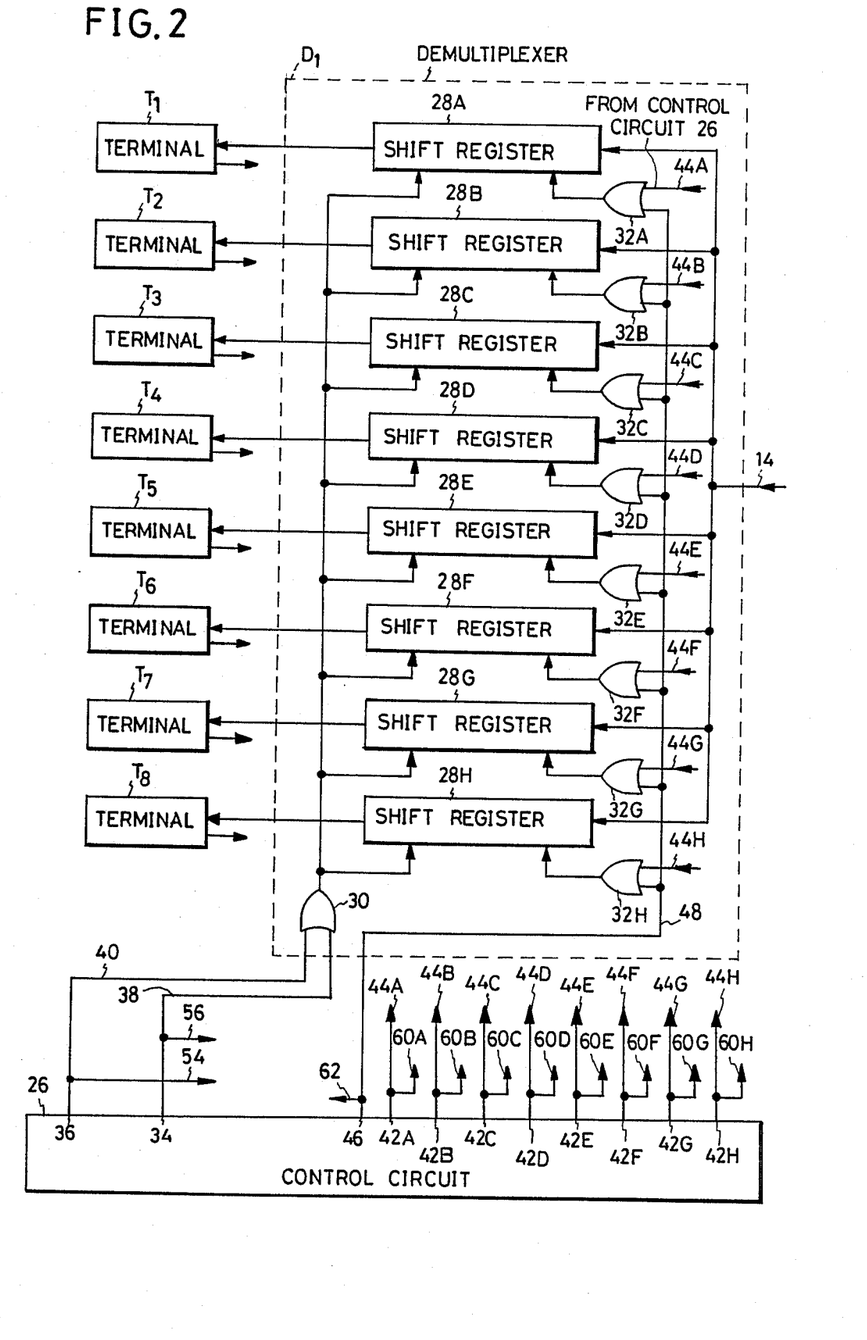
FIG. 2 is a block diagram showing in more detail one of the demultiplexers in the key telephone system of FIG. 1, the representative demultiplexer being shown together with the associated terminal devices and control circuit of the system.

All the demultiplexers D1–D4 are of identical construction. In FIG. 2, therefore, we have shown only the first demultiplexer D1 together with the associated Group I of terminals T1–T8 and the connections of the first demultiplexer with the control circuit 26. The following detailed description of the first demultiplexer D1 substantially applies to each of the other three demultiplexers D2–D3 and its connections with Groups 2, 3 and 4 of terminals T9–T32 and with the control circuit 26.

The representative first multiplexer D1 has eight memories herein shown as shift registers 28A–28H corresponding respectively to the eight terminals T1–T8 constituting Group I of such terminals. These shift registers function both for the demultiplexing of the time division multiplex data signal from the input highway 14 and as buffers for compensating for a required difference in the rate of data flow on their input and output sides. The speed of data flow on the input highway 14 (and output highway 16) is higher than that from the demultiplexers D1–D4 to the terminals T1–T32 (and from the terminals to the multiplexers M1–M4). Each shift register has a data input coupled to the input highway 14, a data output coupled to the corresponding one of the terminals T1–T8, a clock input and a strobe input. The clock inputs of all the shift registers are coupled to a common OR gate 30, whereas their strobe inputs are coupled to respective OR gates 32A–32H.

The OR gate 30 has its two inputs coupled to the two clock outputs 34 and 36 of the control circuit 26 via a write clock line 38 and read clock line 40, respectively. The clock output 34 provides a clock signal of a relatively high repetition frequency, and the other clock output 36 that of a relatively lower repetition frequency. The demultiplexer D1 uses the higher frequency clock signal for controlling the writing of the multiplex data signal onto the shift registers 28A–28H and the lower frequency clock signal for controlling the readout of the data from the shift registers. However, the two different frequency clock signals are used for the opposite purposes by the multiplexers M1–M4, as will be understood from the subsequent description of FIG. 3.

Connected to the strobe inputs of the shift registers 28A–28H, the OR gates 32A–32H are coupled to individual strobe outputs 42A–42H of the control circuit 26 by way of write strobe lines 44A–44H, respectively, on one hand and, on the other hand, to a common strobe output 46 of the control circuit by way of a read strobe line 48. We have shown the write strobe lines 44A–44H broken away for illustrative convenience only.

The shift registers 28A–28H permit the corresponding channels of data on the input highway 14 to be written sequentially thereon in response to the write strobe signals from the individual strobe outputs 42A–42H of the control circuit 26 and to the write clock signal from the clock output 34 of the control circuit. Also, in response to the read strobe signal from the common strobe output 46 of the control circuit 26 and to the read clock signal from the clock output 36 of the control circuit, the shift registers 28A–28H permit the data to be read out for delivery to the corresponding channels of terminals T1–T8. Like the two clock signals from the clock outputs 34 and 36 of the control circuit 26, the set of eight individual strobe signals from the strobe outputs 42A–42H and the common strobe signal from the strobe output 46 are further delivered to each of the multiplexers M1–M4 and are thereby used for the purposes opposite to those for which they are utilized by the demultiplexers D1–D4.

Multiplexers

Figure 3:
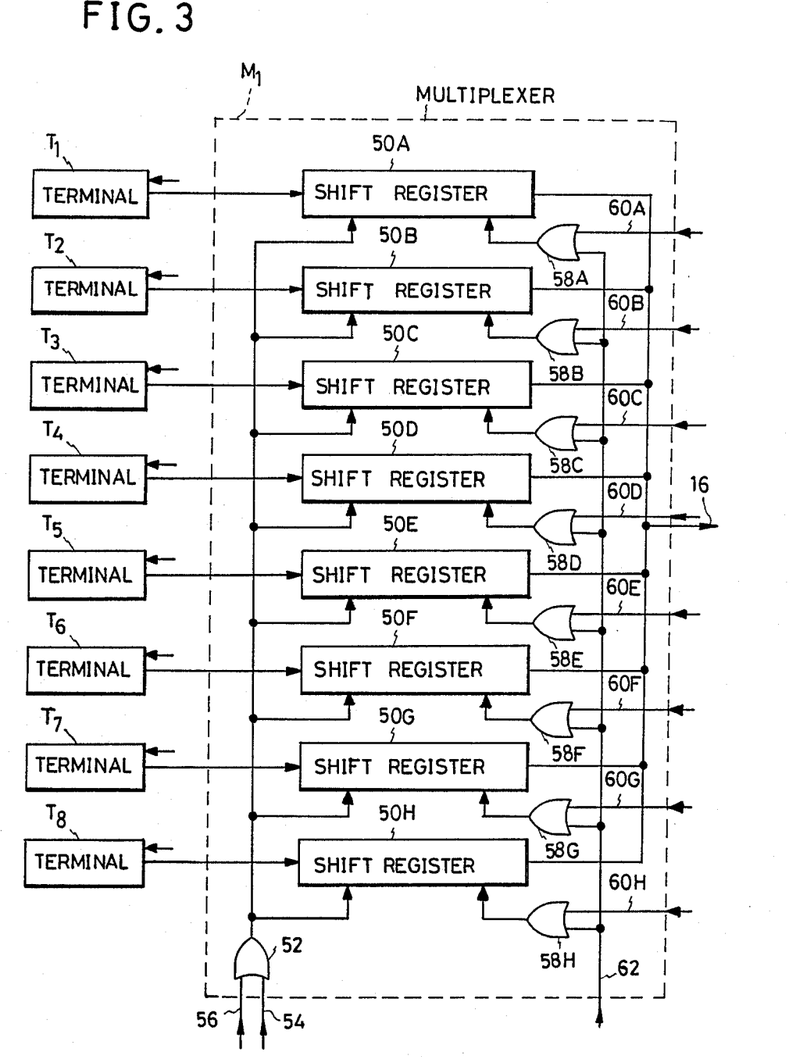
FIG. 3 is a block diagram showing in more detail one of the multiplexers in the key telephone system of FIG. 1, together with the associated terminal devices.

Since all the multiplexers M1–M4 are identical in construction, we will describe only the first multiplexer M1 in connection with the associated first group of terminals T1–T8 and the control circuit 26, it being understood that the same description substantially applies to each of the other three multiplexers M2–M4.

With reference to FIG. 3 the representative first multiplexer M1 comprises eight memories herein shown as shift registers 50A–50H, which correspond respectively to the eight terminals T1–T8 forming the first group of such terminals. These shift registers serve the dual purpose of time division multiplexing the eight channels of data from the first group of terminals T1–T8 and of compensating for the noted difference in the speed of data transmission on their input and output sides.

Each multiplexing shift register has a data input coupled to the corresponding one of the first group of terminals T1–T8, a data output coupled to the common output highway 16, a clock input and a strobe input. The clock inputs of all the multiplexing shift registers 50A–50H are coupled via a common OR gate 52 to both write clock line 54 and read clock line 56. The strobe inputs of all the multiplexing shift registers are coupled via respective OR gates 58A–58H to both respective read strobe lines 60A–60H and common write strobe line 62.

The individual channels of data originated at the first group of terminals T1–T8 can be written on the multiplexing shift registers 50A–50H at the same low speed as the reading of the data from the demultiplexing shift registers 28A–28H, FIG. 2, for delivery to the terminals. Accordingly, the write clock line 54 is coupled to the lower frequency clock output 36, FIG. 2, of the control circuit 26, to which output is also coupled the read clock line 40 of the demultiplexing shift registers 28A–28H. However, the multiplexing shift registers 50A–50H must be read at the same high speed as the writing of the multiplex data onto the demultiplexing shift registers 28A–28H. Thus the read clock line 56 is coupled to the higher frequency clock output 34, FIG. 2, of the control circuit 26, as is the write clock line 38 of the demultiplexing shift registers 28A–28H.

The eight channels of data from the first group of terminals T1–T8 are written simultaneously onto the first group of multiplexing shift registers 50A–50H, although the different groups of channels of data are written at different times onto the different groups of multiplexing shift registers. Therefore, the strobe inputs of all the multiplexing shift registers 50A–50H are coupled to the common strobe output 46, FIG. 2, of the control circuit 26 by way of the write strobe line 62. It will be seen, then, that the write strobe signal for the multiplexing shift registers 50A–50H of FIG. 3 is equivalent to the read strobe signal for the demultiplexing shift registers 28A–28H of FIG. 2.

It will be noted from FIGS. 2 and 3 that the separate read strobe lines 60A–60H for the multiplexing shift registers 50A–50H are coupled to the respective strobe outputs 42A–42H of the control circuit 26. The read strobe signals for the multiplexing shift registers 50A–50H are therefore equivalent to the write strobe signals for the demultiplexing shift registers 28A–28H. Just as the demultiplexing shift registers 28A–28H permit the corresponding channels of data to be written sequentially thereon in response to the individual write strobe signals from the strobe outputs 42A–42H of the control circuit 26, so the multiplexing shift registers 50A–50H respond to the read strobe signals from the same outputs of the control circuit for permitting the sequential readout of the corresponding channels of data.

Operation

Although the representative key telephone system 10 is of 32 channel construction, terminals or telephones may, or may not, be used on all the available channels in the use of the system, with some channels left unused or standing by for future use. We will assume, however, that all the channels are used by the terminals T1–T32, as in FIG. 1, for the ease of explanation and understanding. Also, although messages are, of course, first transmitted from, and then received by, the terminals, we will first describe the method of data reception (demultiplexing) and then the method of data transmussion (multiplexing). This is because the fundamental concepts of our invention best manifest themselves in the process of data reception.

Data Reception (Demultiplexing)

Figure 4:
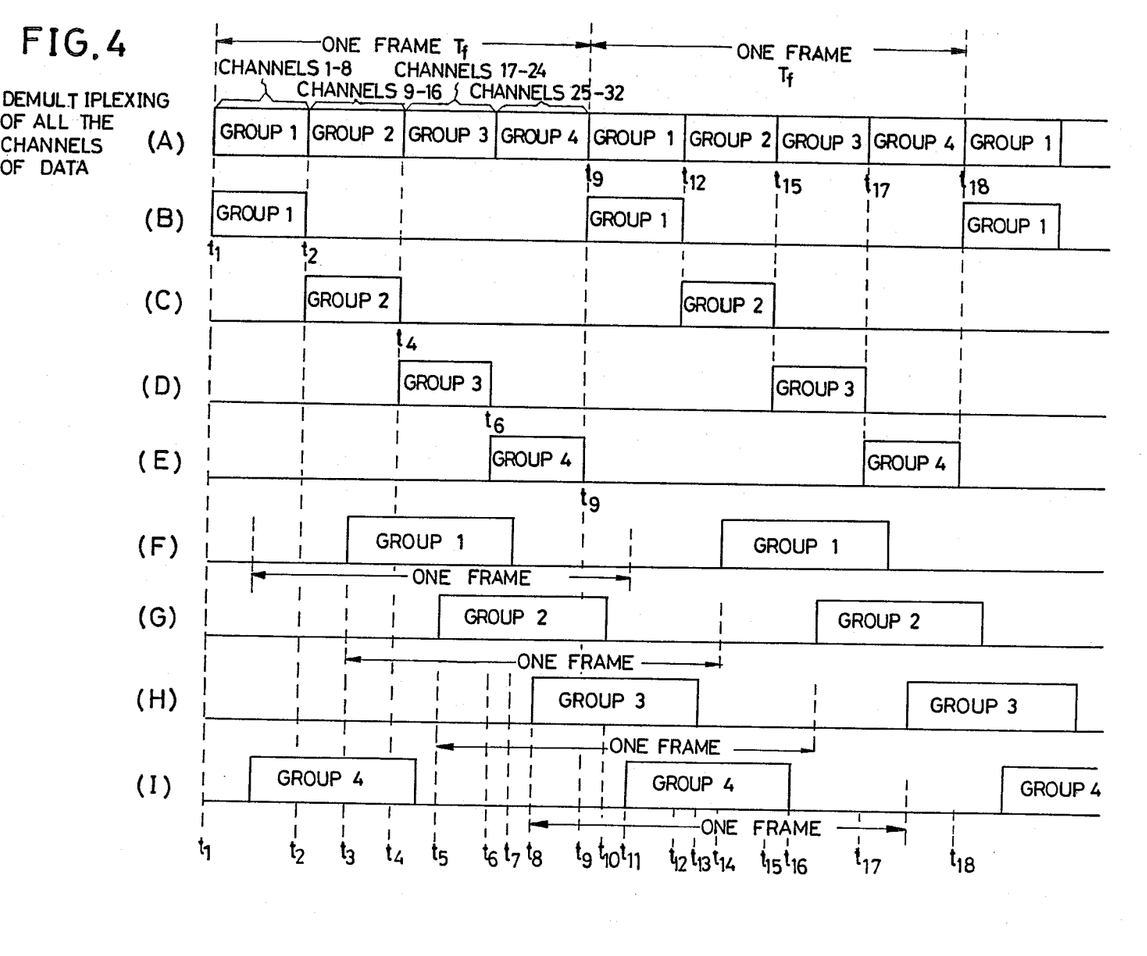
FIG. 4 is a timing diagram explanatory of the way in which all the available channels are demultiplexed in the key telephone system of FIG. 1.

At (A) in FIG. 4 we have shown the format of the four groups of 32 channels of data being transmitted serially by time division multiplexing over the input highway 14, FIGS. 1 and 2, extending from the switching circuit 12 to the four demultiplexers D1–D4. It will be seen that the 32 channels of data are assigned respectively to a set of as many time slots making up one frame. Two such consecutive frames are shown by way of example. The 32 channels of data are shown equally divided into four groups, with Channels 1–8 forming Group 1, Channels 9–16 Group 2, Channels 17–24 Group 3, and Channels 25–32 Group 4. These four groups of channels of data are separately written onto, and read out from, the four demultiplexers D1–D4, respectively, for demultiplexing, as will be understood from the following description of (B) through (I) of FIG. 4.

As indicated at (B) in FIG. 4, Channels 1–8 (Group 1) of data are written sequentially onto the eight demultiplexing shift registers 28A–28H of the first demultiplexer D1 during the successive spaced time intervals as from moment t1 to moment t2, from moment t9 to moment t12, etc. The separate write strobe signals are fed from the control circuit 26 to the demultiplexing shift registers 28A-28H by way of the respective write strobe lines 44A-44H to enable such sequential writing of Channels 1-8 of data. The writing of the data onto the demultiplexing shift registers 28A-28H must take place at the relatively higher speed at which the multiplex data signal journeys over the input highway 14 (and output highway 16). Therefore, during such writing, the write clock signal is delivered to the demultiplexing shift registers from the higher frequency clock output 34 of the control circuit 26.

Likewise, Channels 9-16 (Group 2) of data are written sequentially onto the shift registers of the second demultiplexer D2 during the successive spaced time intervals of t2-t4, t12-t15, etc., as at (C) in FIG. 4. Channels 17-24 (Group 3) of data are written sequentially onto the shift registers of the third demultiplexer D3 during the successive spaced time intervals of t4-t6, t15-t17, etc., as at (D) in FIG. 4. Channels 25-32 (Group 4) of data are written sequentially onto the shift registers of the fourth demultiplexer D4 during the successive spaced time intervals of t6-t9, t17-t18, etc., as at (E) in FIG. 4.

The foregoing will have made clear that each group of channels of data are written onto the corresponding group of demultiplexing shift registers during one fourth of each frame time Tf. No data is written onto each group of demultiplexing shift registers during the remaining three fourths of each frame time Tf, that is, during a time interval from the end of the writing of the corresponding group of channels of data of one frame to the beginning of the writing of the same group of channels of data of the next frame. As will be seen from (B), (C), (D) and (E) in FIG. 4, one such time interval is from moment t2 to moment t9 for Group 1 of channels, from moment t4 to moment t12 for Group 2 of channels, from moment t6 to moment t15 for Group 3 of channels, and from moment t9 to moment t17 for Group 4 of channels.

We suggest, therefore, the readout of the data from each group of demultiplexing shift registers during at least part of each such time interval from the end of the writing of the corresponding group of channels of data of one frame to the beginning of the writing of the same group of channels of data of the next frame. Thus Group 1 of channels of data that have been written on the first group of demultiplexing shift registers 28A-28H during the t1-t2 interval, for example, as at (B) in FIG. 4 are read out therefrom during the longer time interval of t3-t7 as at (F) in FIG. 4. Group 2 of channels of data that have been written on the second group of demultiplexing shift registers during the t2-t4 interval, for example, as at (C) in FIG. 4 are read out therefrom during the t5-t10 interval as at (G) in FIG. 4. Group 3 of channels of data that have been written on the third group of demultiplexing shift registers during the t4-t6 interval, for example, as at (D) in FIG. 4 are read out therefrom during the t8-t13 interval as at (H) in FIG. 4. Group 4 of channels of data that have been written on the fourth group of demultiplexing shift registers during the t6-t9 interval, for example, as at (E) in FIG. 4 are read out therefrom during the t11-t16 interval as at (I) in FIG. 4.

The data must be read out as above at the relatively lower speed suitable for the delivery of such data to the terminals T1-T32. Accordingly, the required read clock signal is fed from the lower frequency clock output 36 of the control circuit 26 to the demultiplexing shift registers during such readout.

Figure 5:
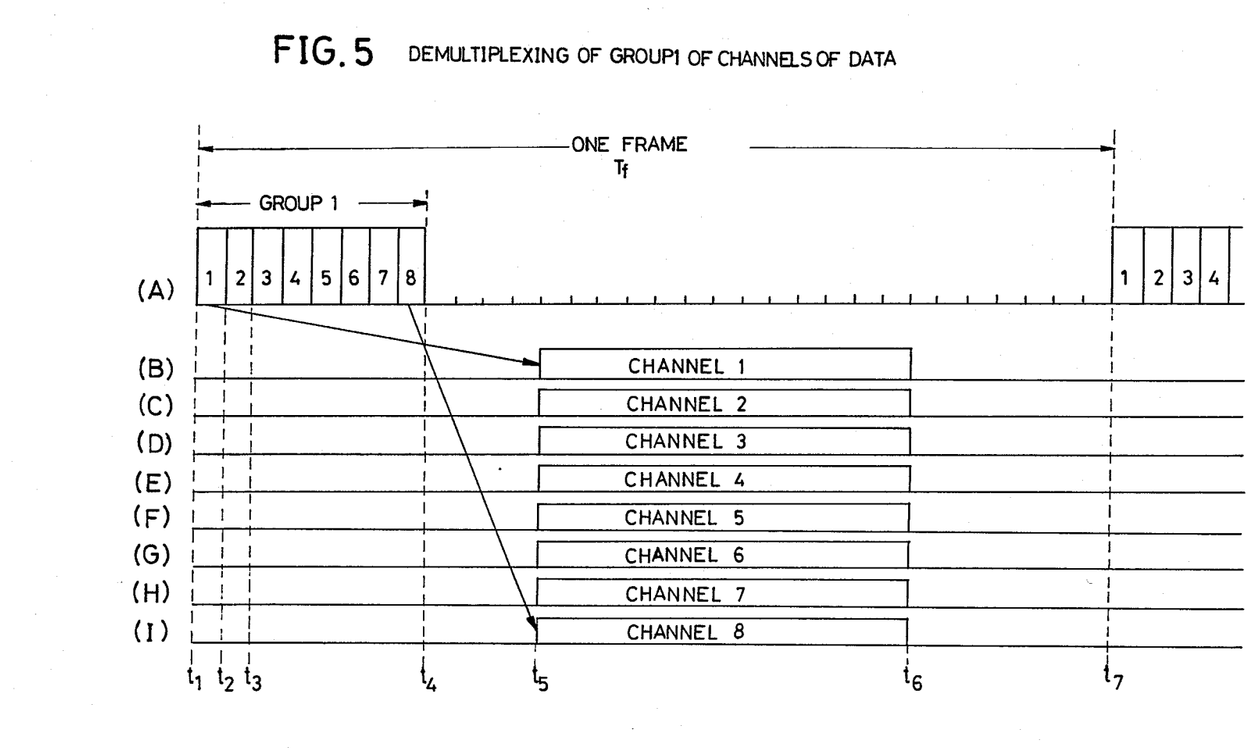
FIG. 5 is a more detailed timing diagram explanatory of the way in which one group of channels are demultiplexed.

FIG. 5 is a more detailed timing diagram explanatory of the writing of Group 1 of channels of data onto the first group of shift registers 28A-28H, and the subsequent readout of these channels of data, during one frame time Tf. The time interval t1-t7 of FIG. 5 is equivalent to the time interval t1-t9 of FIG. 4.

Since Channels 1-8 are assigned to the first eight of the 32 time slots of one frame of the multiplex data signal shown at (A) in FIG. 4, the first demultiplexing shift register 28A permits Channel 1 of serial data on the input highway 14 to be written thereon in response to a strobe pulse fed from the first strobe output 42A of the control circuit 26 at the moment t1, as at (A) in FIG. 5. The first demultiplexing shift register 28 inputs at the same time the write clock signal from the higher frequency clock output 34 of the control circuit 34. This clock signal enables the first demultiplexing register 28A to admit the data at the high transmission speed of such data on the input highway 14. The writing of Channel 1 of data, which may be of eight bits, is shown completed at a moment t2.

As shown also at (A) in FIG. 5, Channel 2 of data are written on the second demultiplexing shift register 28B from moment t2 to moment t3, as a strobe pulse is impressed thereto from the second strobe output 42B of the control circuit 26 at the moment t2. Channels 3-8 of data are similarly written sequentially on the third to eighth demultiplexing shift registers 28C-28H respectively. The writing of all the channels of data of Group 1 is completed at a moment t4.

As will be seen from (A)-(I) in FIG. 5, Channels 1-8 of data that have been written as above during the time interval t1-t4 on the demultiplexing shift registers 28A-28H are read out therefrom during a subsequent time interval t5-t6. This read time interval is longer than the write time interval t1-t4 because the data must be read out at the speed lower than that of writing. The read time interval t5-t6 is thoroughly contained in the time interval t4-t7, which corresponds to the time interval t2-t9 of FIG. 4, during which no data is introduced into the first demultiplexer D1. The strobe signal for such readout of Channels 1-8 of data is fed from the common strobe output 46, FIG. 2, of the control circuit 26 by way of the common read strobe line 48 and respective OR gates 32A-32H. All the eight channels of data are therefore read out simultaneously for delivery to the first group of terminals T1-T8. The readout speed is controlled by the clock signal from the lower frequency clock output 36 of the control circuit 46.

We wish to point out in connection with FIG. 5 that Group 1 of channels of data are written one after another on the corresponding demultiplexing shift registers 28A-28H in a minimum of time from moment t1 to moment t4. A much longer time interval t4-t7 is thus created between the write time intervals of the same group of channels of data of the successive frames. The time interval t4-t7 is so long in comparison with the write time interval t1-t2, t2-t3, etc., of each channel of data that each group of channels of data can be read out during this longer time interval at the required low speed suitable for the delivery of the data to the corresponding group of terminals T1-T8.

It is, of course, understood that the Groups 2, 3 and 4 of channels of data are each demultiplexed in the same way as Group 1, preparatory to delivery to the corresponding three groups of terminals T9-T16, T17-T24 and T25-T32. Thus, for four groups of 32 channels represented by the embodiment of FIG. 1, there may be provided only as many groups of as many shift registers both for demultiplexing the incoming data signal and for compensating for the difference in the rate of data flow on their input and output sides. The circuit configuration required for these purposes in accordance with our invention is much simpler than heretofore.

Data Transmission (Multiplexing)

The process of data transmission in the key telephone system 10 of FIG. 1 is, essentially, that of time division multiplexing four groups of 32 channels of data from the terminals T1-T32, into the multiplex data signal shown at (I) in FIG. 4. The process of such time division multiplexing will become apparent from a study of FIG. 6.

Figure 6:
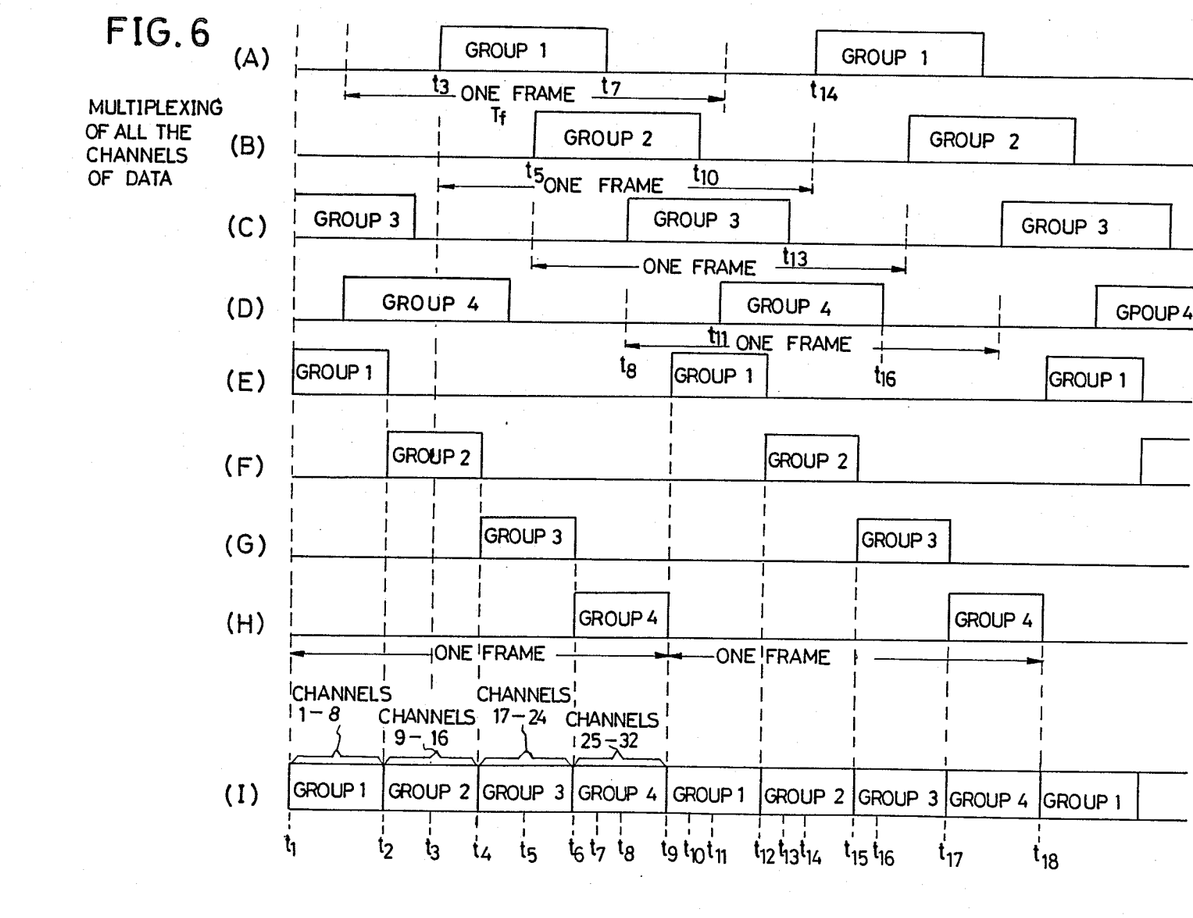
FIG. 6 is a timing diagram explanatory of the way in which all the available channels are multiplexed in the key telephone system of FIG. 1.

As indicated at (A)-(D) in FIG. 6, the four groups of channels of eight-bit data originating at the corresponding groups of terminals T1-T8, T9-T16, T17-T24 and T25-T32 are written at the relatively low speed on the respective groups of multiplexing shift registers 50A-50H, etc., at different, overlapping series of spaced apart, prescribed writing periods. Thus, for example, Group 1 of channels of data are written on the shift registers 50A-50H of the first multiplexer M1 from moment t3 to moment t7; Group 2 of channels of data on the shift registers of the second multiplexer M2 from moment t5 to moment t10; Group 3 of channels of data on the shift registers of the third multiplexer M3 from moment t8 to moment t13; and Group 4 of channels of data on the shift registers of the fourth multiplexer M4 from moment t11 to moment t16.

It is to be noted that each writing period is shorter than one frame time Tf, with the consequent creation of time spacings between the successive writing periods. In the case of the writing of Group 1 of channels of data as at (A) in FIG. 6, for example, one time spacing exists from moment t7 to moment t14. Such time spacings can be used for the readout of the data from the multiplexers M1-M4 in such a way as to create the desired time division multiplex data signal, as discussed in more detail hereafter.

As will be seen from (E)-(H) in FIG. 6, after having been written on the corresponding multiplexers M1-M4, Group 1 of channels of data are read out at the relatively higher speed from moment t1 to moment t2, from moment t9 to moment t12, etc; Group 2 of channels of data from moment t2 to moment t4, from moment t12 to moment t15, etc.; Group 3 of channels of data from moment t4 to moment t6, from moment t15 to moment t17, etc.; and Group 4 of channels of data from moment t6 to moment t9, from moment t17 to moment t18, etc. With Groups 1, 2, 3 and 4 of channels of data thus read out sequentially, with no time spacings between the read time intervals of the four groups, there can be obtained on the output highway 16 the desired multiplex data signal, shown at (I) in FIG. 6, in which the 32 channels of data are assigned respectively to a set of 32 consecutive time slots in each frame. The multiplex data signal of FIG. 6(I) is equivalent to that of FIG. 4(A).

Figure 7:
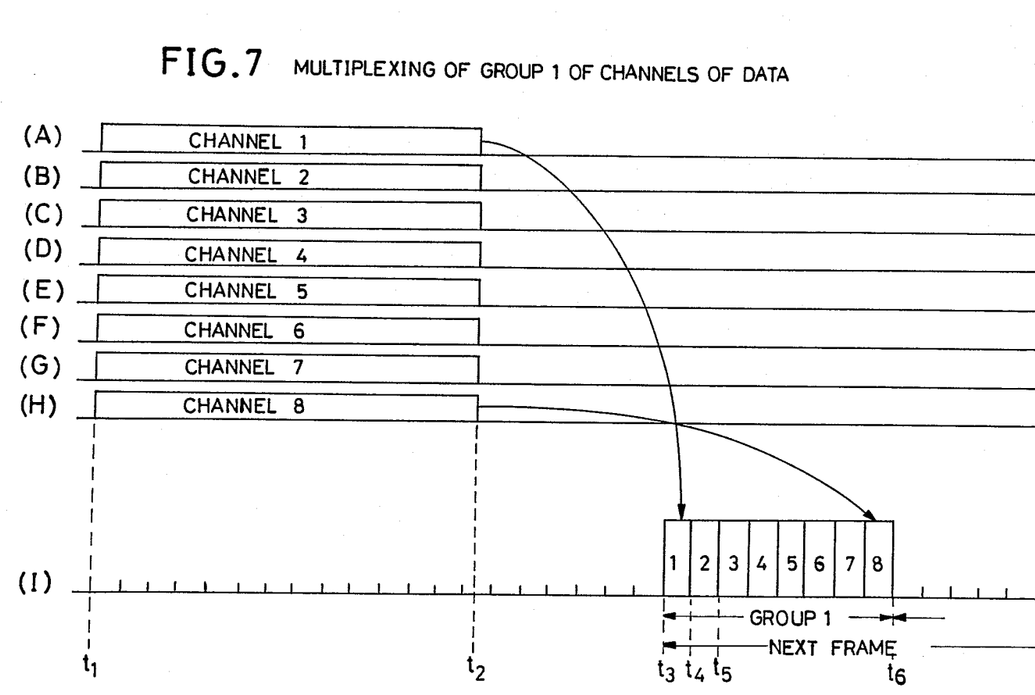
FIG. 7 is a more detailed timing diagram explanatory of the way in which one group of channels are multiplexed.

FIG. 7 is a more detailed timing diagram explanatory of the way in which Group 1 of channels (1-8) of data are written on and read from the shift registers 50A-50H, FIG. 3, of the multiplexer M1. The time interval t1-t6 of FIG. 7 correspond to the time interval t3-t12 of FIG. 6.

Fed serially at the relatively low speed from the respective terminals T1-T8, Channels 1-8 of eight-bit data are simultaneously written on the respective multiplexing shift registers 50A-50H from moment t1 to moment t2 in FIG. 7, as indicated at (A)-(H) in FIG. 7. The common write strobe signal will be impressed to the multiplexing shift registers 50A-50H from the common strobe output 46, FIG. 2, of the control circuit 26 by way of the write strobe line 62 to initiate such simultaneous writing of the first group of channels of data at the moment t1. The control circuit 26 will also deliver the write clock signal to the multiplexing shift registers 50A-50H from its lower frequency clock output 36 by way of the line 54 in order to enable the shift registers to admit the data at the relatively lower speed of data transmission from the terminals T1-T8.

At a moment t3 following the moment t2 when the simultaneous writing of Channels 1-8 of data is completed, the control circuit 26 will deliver the first read strobe signal from its strobe output 42A to the first multiplexing shift register 50A by way of the individual read strobe line 60A. Thereupon Channel 1 of eight-bit data will be serially read out from the first multiplexing shift register 50A during the time interval t3-t4, as at (I) in FIG. 7, at the relatively higher speed dictated by the read clock signal fed from the higher frequency clock output 34 of the control circuit 26 by way of the line 56.

The read clock signal fed from the clock output 34 of the control circuit 26 is very much higher in frequency than the write clock signal from its clock output 36. Consequently, the interval t1-t2 required for writing each channel of data on the corresponding one of the multiplexing shift registers 50A-50H is compressed, so to say, into the much shorter time interval t3-t4 for reading out the same channel of data. That is to say that each multiplexing shift register functions as a buffer for compensating for the required difference between the incoming and outgoing data flow rates, besides functioning as a multiplexer.

As shown also in FIG. 7(I), Channel 2 of data will be serially read out at the relatively higher speed from the second multiplexing shift register 50B during the time interval t4-t5 upon delivery of the second read strobe signal thereto from the second individual strobe output 42B of the control circuit 26 at the moment t4. Thereafter Channels 3-8 of data will be similarly read out from the corresponding multiplexing shift registers 50C-50H.

Group 1 of channels of data are thus multiplexed as at (I) in FIG. 7, with Channels 1-8 of data assigned to the consecutive time slots from moment t3 to moment t6. Groups 2-4 of channels of data are multiplexed in a like manner. As will be understood by referring again to FIG. 6, the time interval t3-t6 of FIG. 7 occupies one fourth of one frame, so that the other three groups of channels of data can be assigned to the remaining three fourths of each frame to make up the time division multiplex data signal of FIG. 6(I) or FIG. 4(A).

As may have been understood from the foregoing discussion of data transmission and reception by the key telephone system 10 of FIG. 1, the individual write strobe signals for the demultiplexing shift registers of FIG. 2 and the individual read strobe signals for the multiplexing shift registers of FIG. 3 are supplied from the same outputs of the control circuit 26. The common read strobe signal for the demultiplexing shift registers and the common write strobe signal for the multiplexing shift registers are also supplied from the same output of the control circuit 26. Further the two different frequency clock signals from the same outputs of the control circuit 26 are used to determine the reading and writing speeds of the demultiplexers D1–D4 and multiplexers M1–M4. Accordingly, not only is exact frame synchronization realized, but also the control circuit can be materially simplified in construction.

Despite the foregoing detailed description, we do not wish our invention to be limited to the exact details of the illustrated embodiment, since a variety of modifications or alterations of the embodiment will readily occur to one skilled in the art within the broad teaching of our invention. The following is a brief list of such possible modifications or alterations:

1. The number of channels and the number of groups of such channels may be chosen as desired or required in the practice of our invention. There should, however, be at least six channels, and these should be divided into at least three groups, for proper data transmission and/or reception in accordance with our invention.
2. Telephone sets or other terminal devices may not necessarily be used on all the available channels.
3. The multiplexing and demultiplexing shift registers may be replaced by other kinds of memories.
4. Each group of channels of data may not necessarily be written simultaneously on the corresponding group of multiplexing shift registers or other memories, but at slightly different times.

What we claim is:

1. A multichannel data transmission method which comprises:
    (a) providing a common time-divided highway;
    (b) transmitting at least six channels of data in at least three groups over the common time-divided highway in serial format and at a first speed, with the at least six channels of data assigned respectively to a set of a corresponding number of consecutive time slots making up one frame;
    (c) sequentially writing the at least three groups of at least six channels of data onto corresponding numbers of groups of memories, respectively, at the first speed;
    (d) reading out the data from each group of memories at a second speed lower than the first speed during a time interval from the end of writing of the corresponding group of channels of data of one frame to the beginning of the writing of the same group of channels of data of the next frame; and
    (e) transmitting the at least six channels of data, read out from the respective memories as in step (d), over a corresponding number of channel paths, respectively, at the second speed.

2. The multichannel data transmission method of claim 1 wherein the data are read out from each group of memories simultaneously.

3. A multichannel data transmission method which comprises:
    (a) providing at least three groups of at least six terminal devices for the transmission and reception of data by time division multiplexing;
    (b) time division multiplexing at least three groups of at least six channels of data originating respectively at the at least three groups of the at least six terminal devices, with the at least six channels of data assigned respectively to a set of a corresponding number of consecutive time slots making up one frame;
    (c) serially transmitting the time division multiplexed data over an output highway at a first speed;
    (d) switching the data being transmitted;
    (e) again serially transmitting the at least three groups of the at least six channels of data by time division multiplexing over an input highway in the same frame format and at the same speed as on the output highway;
    (f) writing the at least three groups of the at least six channels of data onto corresponding numbers of groups of demultiplexing memories, respectively, at the first speed;
    (g) reading out the data from each group of demultiplexing memories at a second speed lower than the first speed during a time interval from the end of the writing of the corresponding group of channels of data of one frame to the beginning of the writing of the same group of channels of data of the next frame; and
    (h) delivering the at least six channels of data, read out from the demultiplexing memories as is step (g), to the at least six terminal devices, respectively, at the second speed.

4. The multichannel data transmission method of claim 3 wherein the data originating at the terminal devices are time division multiplexed by:
    (a) transmitting m groups of n channels of data from the m groups of n terminal devices, respectively, at the second speed;
    (b) writing the m groups of n channels of data onto m groups of n multiplexing memories, respectively, at the second speed, each group of multiplexing memories accepting the corresponding group of channels of data during a different series of spaced-apart, prescribed writing periods each shorter than one frame; and
    (c) sequentially reading out the data from each group of multiplexing memories at the first speed during the time spacings between the successive prescribed writing periods of that group of multiplexing memories.

5. The multichannel data transmission method of claim 4 wherein each group of channels of data are written simultaneously onto the corresponding group of multiplexing memories.

6. A multichannel data transmission system comprising:
    (a) a highway for the time division multiplex transmission of at least six channels of data in at least three groups in serial format and at a first speed, with the at least six channels of data assigned respectively to a set of a corresponding number of consecutive time slots making up one frame;
    (b) at least three groups of at least six demultiplexing memories coupled to the highway and corresponding respectively to the at least three groups of the at least six channels;
    (c) a control circuit coupled to the demultiplexing memories for sequentially writing the at least three groups of the at least six channels of data onto the at least three groups of the at least six demultiplexing memories, respectively, at the first speed, the control circuit being further effective for reading out the data from each group of memories at a second speed lower than the first speed during a time interval from the end of writing of the corresponding group of channels of data of one frame to the beginning of the writing of the same group of channels of data of the next frame; and (d) at least six output lines coupled one to each demultiplexing memory for the transmission of the at least six channels of data, read out from the respective demultiplexing memories, at the second speed.

7. A multichannel data transmission system comprising:
 (a) a highway for the time division multiplex transmission of n channels of data in m groups in serial format and at a first speed, where n is at least six and m is at least three, with the n channels of data assigned respectively to a set of n consecutive time slots making up one frame;
 (b) m groups of n demultiplexing shift registers corresponding respectively to the m groups of n channels, each demultiplexing shift register having a data input coupled to the highway, a data output, a clock input and a strobe input;
 (c) a control circuit coupled to the clock inputs and strobe inputs of the demultiplexing shift registers for supplying thereto a write clock signal and a write strobe signal such that the m groups of n channels of data are written sequentially onto the corresponding demultiplexing shift registers at the first speed, the control circuit further supplying to the clock inputs and strobe inputs of the demultiplexing shift registers a read clock signal and a read strobe signal such that each group of demultiplexing shift registers are read simultaneously at a second speed lower than the first speed during a time interval from the end of the writing of the corresponding group of channels of data of one frame to the beginning of the writing of the same group of channels of data of the next frame; and
 (d) n output lines coupled one to each demultiplexing shift register for the transmission of the n channels of data, read out from the respective demultiplexing shift registers, at the second speed.

8. A multichannel data transmission system comprising:
 (a) m groups of n terminal devices for the transmission and reception of m groups of n channels of data by time division multiplexing, where m is at least three and n is at least six;
 (b) m groups of n multiplexing memories coupled one to each terminal device for multiplexing the data to be transmitted;
 (c) a control circuit coupled to the multiplexing memories and coacting therewith for time division multiplexing the m groups of n channels of data by controlling the writing and reading of such data onto and from the multiplexing memories, with the n channels of data assigned respectively to a set of n consecutive time slots making up one frame;
 (d) an output highway for serially transmitting the time division multiplexed data at a first speed;
 (e) a switching circuit coupled to the output highway for switching the data being transmitted;
 (f) an input highway coupled to the switching circuit for serially transmitting the switched data in the same frame format and at the same speed as on the output highway;
 (g) m groups of n demultiplexing memories connected between the input highway and the terminal devices for demultiplexing the data prior to delivery to the terminal devices;
 (h) the control circuit being further coupled to the demultiplexing memories and coacting therewith for demultiplexing the data by writing the m groups of n channels of data onto the m groups of n demultiplexing memories, respectively, at the first speed and by reading out the data from each group of demultiplexing memories at a second speed lower than the first speed during each time interval from the end of the writing of the corresponding group of channels of data of one frame to the beginning of the writing of the same group of channels of data of the next frame.

9. The multichannel data transmission system of claim 8 wherein the multiplexing memories are multiplexing shift registers each having a data input coupled to one terminal device, a data output coupled to the output highway, a clock input and a strobe input, and wherein the control circuit is coupled to the clock inputs and strobe inputs of the multiplexing shift registers, the control circuit coacting with the multiplexing shift registers for multiplexing the data by supplying thereto a write clock signal and write strobe signal such that the m groups of n channels of data are written onto the m groups of n multiplexing shift registers, respectively, at the second speed, each group of multiplexing shift registers accepting the corresponding group of channels of data during a different series of spaced-apart, prescribed writing periods each shorter than one frame, and further by supplying to the multiplexing shift registers a read clock signal and a read strobe signal such that the data are sequentially read out from each group of multiplexing shift registers at the first speed during the time spacings between the successive prescribed writing periods of that group of multiplexing shift registers.

10. The multichannel data transmission system of claim 9 wherein the demultiplexing memories are demultiplexing shift registers each having a data input coupled to the input highway, a data output coupled to one terminal device, and a clock input and strobe input coupled to the control circuit, the control circuit controlling the demultiplexing of the data by supplying a second write clock signal and second write strobe signal to the demultiplexing shift registers for enabling the writing of the data on the demultiplexing shift registers and by supplying a second read clock signal and second read strobe signal to the demultiplexing shift registers for reading out the data therefrom.

11. A multichannel data transmission system comprising:
 (a) m groups of n terminal devices for the transmission and reception of m groups of n channels of data by time division multiplexing, where m is at least three and n is at least six;
 (b) m groups of n multiplexing shift registers for multiplexing the data to be transmitted into a prescribed frame format, each multiplexing shift register having a data input coupled to one terminal device, a data output, a clock input and a strobe input;
 (c) an output highway cupled to the data outputs of the multiplexing shift registers for serially transmitting the time division multiplexed data at a first speed;
 (d) a switching circuit coupled to the output highway for switching the data being transmitted;
 (e) an input highway coupled to the switching circuit for serially transmitting the switched data in the same frame format and at the same speed as on the output highway;

(f) m groups of n demultiplexing shift registers connected between the input highway and the respective terminal devices for demultiplexing the data prior to delivery to the terminal devices, each demultiplexing shift register having a data input cupled to the input highway, a data output coupled to one terminal device, a clock input and a strobe output; and (g) a control circuit having first and second clock outputs coupled to the clock inputs of the multiplexing and demultiplexing shift registers for selectively delivering two clock signals of predetermined different frequencies thereto, a common strobe output coupled to the strobe inputs of each group of multiplexing shift registers for supplying a common write strobe signal thereto and to the strobe inputs of each group of demultiplexing shift registers for supplying a common read strobe signal thereto, and a set of individual strobe outputs coupled respectively to the strobe inputs of each group of multiplexing shift registers for supplying individual read strobe signals thereto and to the strobe inputs of each group of demultiplexing shift registers for supplying individual write strobe signals thereto, the control circuit coacting with the multiplexing shift registers for time division multiplexing the m groups of n channels of data by controlling the writing and reading of such data onto and from the multiplexing shift registers, with the n channels of data assigned respectively to a set of n consecutive time slots making up one frame, the control circuit further coacting with the demultiplexing shift registers for demultiplexing the switched data by writing the m groups of n channels of data onto the m groups of n demultiplexing shift registers, respectively, at the first speed and by reading out the data from each group of demultiplexing shift registers at a second speed lower than the first speed during each time interval from the end of the writing of the corresponding group of channels of data of one frame to the beginning of the writing of the same group of channels of data of the next frame.

* * * * *

UNITED STATES PATENT AND TRADEMARK OFFICE
CERTIFICATE OF CORRECTION

PATENT NO. : 4,805,165
DATED : February 14, 1989
INVENTOR(S) : Kawamura et al.

It is certified that error appears in the above-identified patent and that said Letters Patent is hereby corrected as shown below:

Column 1, line 38 "multplexing" should be --multiplexing--.

Column 6, line 42 "transmussion" should be --transmission--.

Column 14, line 61 "cupled" should be --coupled--.

Column 15, line 7 "cupled" should be --coupled--.

Signed and Sealed this

Seventeenth Day of October, 1989

Attest:

DONALD J. QUIGG

Attesting Officer

Commissioner of Patents and Trademarks